(12) United States Patent
Mitamura et al.

(10) Patent No.: US 10,960,648 B2
(45) Date of Patent: Mar. 30, 2021

(54) AUTOMOTIVE LAMINATED GLASS, AND PRODUCTION METHOD THEREFOR

(71) Applicant: CENTRAL GLASS COMPANY, LIMITED, Ube (JP)

(72) Inventors: Naoki Mitamura, Matsusaka (JP); Tatsuya Tsuzuki, Matsusaka (JP); Hiroki Nakamura, Matsusaka (JP); Naoya Hirata, Matsusaka (JP)

(73) Assignee: CENTRAL GLASS COMPANY, LIMITED, Ube (JP)

( * ) Notice: Subject to any disclaimer, the term of this patent is extended or adjusted under 35 U.S.C. 154(b) by 8 days.

(21) Appl. No.: 16/477,554

(22) PCT Filed: Nov. 14, 2017

(86) PCT No.: PCT/JP2017/040876
§ 371 (c)(1),
(2) Date: Jul. 12, 2019

(87) PCT Pub. No.: WO2018/131281
PCT Pub. Date: Jul. 19, 2018

(65) Prior Publication Data
US 2020/0122437 A1    Apr. 23, 2020

(30) Foreign Application Priority Data
Jan. 12, 2017 (JP) .............................. JP2017-003076

(51) Int. Cl.
*B32B 17/10* (2006.01)
*B60J 1/02* (2006.01)

(52) U.S. Cl.
CPC .. *B32B 17/10559* (2013.01); *B32B 17/10036* (2013.01); *B32B 17/10165* (2013.01); *B60J 1/02* (2013.01); *B32B 2605/006* (2013.01)

(58) Field of Classification Search
CPC ................................................ B32B 17/10559
(Continued)

(56) References Cited

U.S. PATENT DOCUMENTS

| | | | |
|---|---|---|---|
| 2014/0141206 A1* | 5/2014 | Gillard | B32B 17/10036 428/174 |
| 2015/0314571 A1 | 11/2015 | Cites et al. | |
| 2016/0214889 A1 | 7/2016 | Garner et al. | |

FOREIGN PATENT DOCUMENTS

| | | |
|---|---|---|
| EP | 2695864 A1 | 2/2014 |
| EP | 2723562 A1 | 4/2014 |

(Continued)

OTHER PUBLICATIONS

International Search Report issued in International Application No. PCT/JP2017/040876, dated Feb. 20, 2018 (6 pages).

(Continued)

*Primary Examiner* — Brent T O'Hern
(74) *Attorney, Agent, or Firm* — Osha Bergman Watanabe & Burton LLP

(57) ABSTRACT

An automotive laminated glass includes a thermoplastic interlayer film, a curved first glass sheet, and a curved second glass sheet. The thermoplastic interlayer film is disposed between the first and second glass sheets. The first glass sheet is a 0.7- to 3-mm thick non-chemically strengthened glass sheet including a convex-side first main surface and a concave-side second main surface facing the thermoplastic interlayer film. The second glass sheet is an ion-exchanged, 0.3- to 1.5-mm thick chemically strengthened glass sheet including a convex-side third main surface facing the thermoplastic interlayer film and a concave-side fourth main surface. The second glass sheet is thinner than the first glass sheet. The convex-side third main surface has a compressive stress layer thicker than that on the concave- (Continued)

side fourth main surface, and the second glass sheet is adjusted to fit the curvature of the first glass sheet.

10 Claims, 2 Drawing Sheets

(58) Field of Classification Search
USPC .......................................................... 428/34
See application file for complete search history.

(56) References Cited

FOREIGN PATENT DOCUMENTS

| | | | |
|---|---|---|---|
| JP | 2007197288 A | 8/2007 | |
| JP | 2013126930 A | 6/2013 | |
| JP | 2014527011 A | 10/2014 | |
| JP | 2014218427 A | 11/2014 | |
| JP | 2016008161 A | 1/2016 | |
| JP | 2016530190 A | 9/2016 | |
| JP | 2016538233 A | 12/2016 | |
| JP | 2017052688 A | 3/2017 | |
| WO | 2012137742 A1 | 10/2012 | |
| WO | 2012177426 A1 | 12/2012 | |
| WO | 2015/006201 A1 | 1/2015 | |
| WO | 2015031594 A2 | 3/2015 | |

OTHER PUBLICATIONS

Written Opinion issued in International Application No. PCT/JP2017/040876; dated Feb. 20, 2018 (5 pages).
Extended European Search Report issued in corresponding European Application No. 17890973.5, dated Oct. 2, 2020 (6 pages).

\* cited by examiner

Curving

AUTOMOTIVE LAMINATED GLASS, AND PRODUCTION METHOD THEREFOR

TECHNICAL FIELD

The present invention relates to an automotive laminated glass, and a production method thereof.

BACKGROUND ART

Every year, the automotive industry faces an increasing demand for more efficient consumption of energy such as gasoline or electricity, and weight reduction of components for use in automobiles have been demanded. While thicker glass sheets have higher rigidity, use of ultrathin glass sheets have been newly examined, because weight reduction of windows consisting of glass sheets has been examined. Patent Literatures 1 and 2 each disclose a laminated glass including an external glass sheet and an internal glass sheet. The laminated glass is obtained by laminating an external glass sheet and an ultrathin flat glass sheet with a thermoplastic interlayer film therebetween while the ultrathin flat glass sheet is adjusted to conform to a curved shape of the external glass sheet. In light of weight reduction of an automotive laminated glass, Patent Literature 3 discloses a technique for solving a problem associated with different behaviors of two glass sheets having different thicknesses which occurs when these glass sheets are simultaneously curved.

This technique uses two glass sheets having different compositions to solve the problem. Patent Literature 4 discloses an automotive laminated glass in which an internal glass sheet is chemically strengthened glass, and its thickness and value of compressive stress are defined. Further, Patent Literature 5 discloses an automotive laminated glass in which internal and external glass sheets are chemically strengthened aluminosilicate glass.

CITATION LIST

Patent Literature

Patent Literature 1: JP 2014-527011 T
Patent Literature 2: JP 2007-197288 A
Patent Literature 3: WO 2012/137742
Patent Literature 4: JP 2016-530190 T
Patent Literature 5: JP 2016-8161 A

SUMMARY OF INVENTION

Technical Problem

For weight reduction of an automotive laminated glass, a thin glass sheet is preferably used for the internal glass sheet because the external glass sheet needs to maintain its rigidity. Since use of a thin glass sheet results in low mechanical strength of the laminated glass, the thin glass sheet is preferably chemically strengthened glass. At the same time, since the laminated glass is curved to conform to the design of an automobile, a glass sheet for the laminated glass is preferably one obtainable by float process so that it can be easily curved. In the float process, a glass ribbon to be processed into a glass sheet is brought into contact with a tin bath during the production, so that one main surface (bottom surface) of the glass sheet has a higher tin content than the other main surface (top surface). Due to the tin content, the top surface has a higher ion exchange capacity for chemical strengthening, and has a thicker compressive stress layer formed thereon. Thus, the resulting chemically strengthened glass tends to warp in a convex shape on the top surface.

An automotive laminated glass is obtained by processing an external glass sheet and an internal glass sheet into the same curved shape and laminating these glass sheets with a thermoplastic interlayer film therebetween. In view of workability of the glass sheets, the internal glass sheet is inevitably processed into chemically strengthened glass by forming a compressive stress layer by ion exchange treatment after curving. Warpage may occur during this process, causing deformation of the curved shape of the internal glass sheet.

This makes it difficult to degas between the thermoplastic resin layer and the glass sheets and in a laminating step of laminating the glass sheets and the thermoplastic resin layer together, thus reducing the productivity of the laminated glass.

In view of the above, the present invention aims to provide an automotive laminated glass with improved productivity in light of warpage of chemically strengthened glass, and a method of producing the automotive laminated glass.

Solution to Problem

The present invention provides an automotive laminated glass including: a thermoplastic interlayer film; an external, curved first glass sheet; and an internal, curved second glass sheet, the thermoplastic interlayer film being disposed between the first and second glass sheets, wherein the first glass sheet is a 0.7- to 3-mm thick non-chemically strengthened glass sheet including a convex-side first main surface and a concave-side second main surface facing the thermoplastic interlayer film, the second glass sheet is an ion-exchanged, 0.3- to 1.5-mm glass sheet including a convex-side third main surface facing the thermoplastic interlayer film and a concave-side fourth main surface, the second glass sheet being thinner and less rigid than the first glass sheet, the third main surface has a compressive stress layer thicker than that on the fourth main surface, and the second glass sheet is adjusted to have a curvature equal to the curvature of the first glass sheet.

The chemically strengthened glass whose convex-side third main surface is prepared from a glass sheet having a higher ion exchange capacity is configured such that the compressive stress layer on the convex-side third main surface is thicker than the compressive stress layer on the concave-side fourth main surface. Thus, the second glass sheet has a higher curvature due to warpage after it is processed into chemically strengthened glass. In lamination, the first glass sheet and the second glass sheet are curved to the same curvature while they are non-chemically strengthened glass. The second glass sheet after being processed into chemically strengthened glass has a higher curvature than the first glass sheet, due to the occurrence of warpage of the second glass sheet.

Preferably, the glass sheets have the same curvature to make it easy to degas between the thermoplastic resin layer and the glass sheets in the laminating step of forming a stack of the glass sheets and the thermoplastic resin layer. In the laminated glass in which the second glass sheet is chemically strengthened glass, first, the first glass sheet and the second glass sheet are processed into the same curved shape, and then, the second glass sheet is processed into chemically strengthened glass. Thus, the curvature of the first glass sheet is unlikely to be same as the curvature of the second glass sheet, which reduces the efficiency of the laminating step.

The compressive stress layer on the convex-side third main surface is made thicker than the compressive stress layer on the concave-side fourth main surface. Thereby, the second glass sheet has a higher curvature than the first glass sheet before these layers are formed into a stack. When forming a stack, a gap is generated between the glass sheets in a peripheral region of the stack. The peripheral region can be easily sandwiched by a jig, such as a clip, capable of sandwiching such a region, so that the second glass sheet can be easily adjusted to have a curvature equal to the curvature of the first glass sheet. This can successfully improve the productivity of the automotive laminated glass including chemically strengthened glass that is disposed on the internal side of an automobile.

The "ion exchange capacity" refers to readiness of ion exchange on a surface layer of a glass sheet during chemical strengthening in a method of strengthening a glass sheet by a chemical strengthening method. The chemical strengthening method is a method of increasing the mechanical strength of a glass sheet containing sodium ions as an alkaline component, for example, by bringing the glass sheet into contact with a molten salt containing potassium ions so as to form a compressive stress layer on a surface layer of the glass sheet by ion exchange between the sodium ions in the glass sheet and the potassium ions in the molten salt. When the surface layer of the glass sheet has a high ion exchange capacity, i.e., ion exchange readily occurs on the surface layer, it is possible to obtain a thick compressive stress layer which is formed inwardly from the outermost surface of the surface layer of the glass sheet.

The present invention provides a method of producing an automotive laminated glass, the method including: a glass sheet curving step of softening and curving a 0.7- to 3-mm thick flat first glass sheet and a 0.3- to 1.5-mm thick flat second glass sheet thinner than the first glass sheet while the first glass sheet and the second glass sheet are overlapped with each other, the first glass sheet including a first main surface and a second main surface and the second glass sheet including a third main surface and a fourth main surface, so as to render the first main surface as a convex-side first main surface, the second main surface as a concave-side second main surface, the third main surface as a convex-side third main surface, and the fourth main surface as a concave-side fourth main surface;

a chemically strengthened glass preparing step of forming a compressive stress layer by ion exchange treatment on each of the convex-side third main surface and the concave-side fourth main surface so as to process the second glass sheet into chemically strengthened glass; and a laminating step of disposing the concave-side second main surface and the convex-side third main surface with a thermoplastic interlayer film therebetween to form a stack of the first glass sheet, the second glass sheet, and the thermoplastic interlayer film, and thermocompression bonding the thermoplastic interlayer film, the first glass sheet, and the second glass sheet together, wherein the compressive stress layer on the convex-side third main surface is thicker than the compressive stress layer on the concave-side fourth main surface, the second glass sheet obtained in the chemically strengthened glass preparing step has a curvature higher than the curvature of the first glass sheet, and the second glass sheet is adjusted to fit the curvature of the first glass sheet in the laminating step.

The present production method can successfully improve the productivity of the automotive laminated glass including chemically strengthened glass that is disposed on the internal side of an automobile.

Advantageous Effects of Invention

The automotive laminated glass of the present invention which includes thin chemically strengthened glass for the purpose of weight reduction of the laminated glass can successfully improve the productivity of the laminated glass.

BRIEF DESCRIPTION OF DRAWINGS

FIG. 4(a) is a view that shows a stack of a concave-side second main surface 212 and a convex-side third main surface 223 with a thermoplastic interlayer film 3 therebetween. FIG. 4(b) is a view that describes sandwiching of a peripheral region of the stack by jigs capable of sandwiching such a region so as to adjust a curved shape of a curved glass sheet 22 that has been processed into chemically strengthened glass.

DESCRIPTION OF EMBODIMENTS

Figure 1:
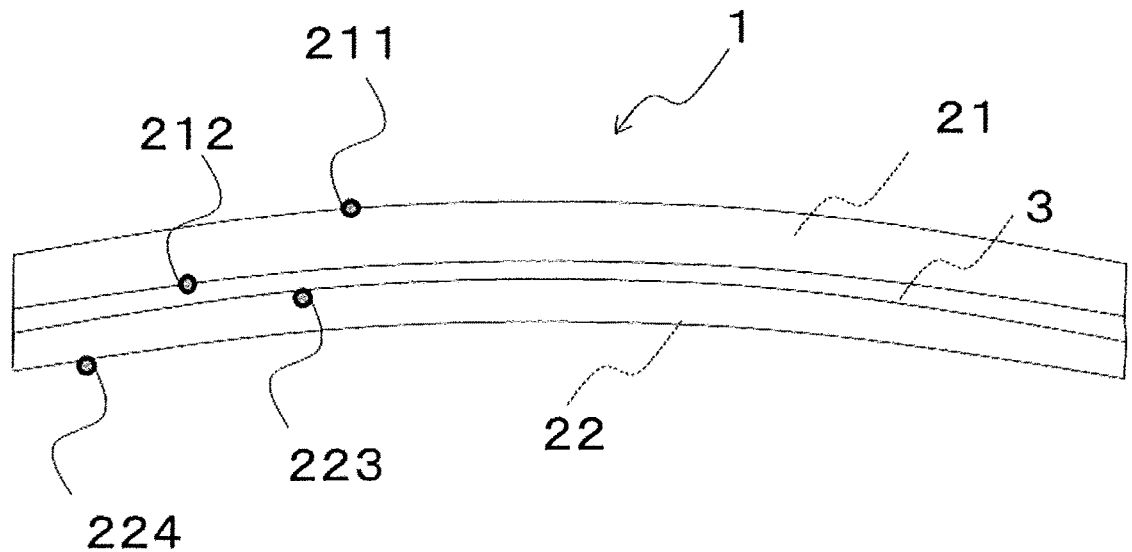
FIG. 1 is a view that schematically describes an automotive laminated glass (cross-section) of the present invention.

An automotive laminated glass 1 of the present invention is described with reference to the drawings. FIG. 1 is a view that schematically describes a cross-section of an automotive laminated glass of the present invention. The automotive laminated glass 1 includes the thermoplastic interlayer film 3, a curved first glass sheet 21, and the curved second glass sheet 22, the thermoplastic interlayer film being disposed between the first glass sheet 21 and the second glass sheet 22.

The first glass sheet 21 is a 0.7- to 3-mm thick non-chemically strengthened glass sheet including a convex-side first main surface 211 and the concave-side second main surface 212 facing the thermoplastic interlayer film 3. The second glass sheet 22 is an ion-exchanged, 0.3- to 1.5-mm thick chemically strengthened glass sheet including the convex-side third main surface 223 facing the thermoplastic interlayer film 3 and a concave-side fourth main surface 224, the second glass sheet being thinner than the first glass sheet 21.

The convex-side third main surface 223 has a compressive stress layer thicker than that on the concave-side forth main surface 224.

The second glass sheet 22 is adjusted to fit the curvature of the first glass sheet 21.

The first glass sheet 21 which is non-chemically strengthened glass is preferably one obtained by curving the flat first glass sheet 21. Examples of usable materials of the first glass sheet 21 include soda-lime silicate glass as defined in ISO 16293-1 and other known glass compositions such as aluminosilicate glass, borosilicate glass, and alkali-free glass.

Another example of the material of the first glass sheet 21 may be a coloring component such as iron or cobalt which is suitably adjusted as a component of a glass composition and which takes on gray, green, or blue hues. The first glass sheet may be one obtained by float process.

The first glass sheet 21 is preferably thicker than the second glass sheet 22 so that it is more rigid than the second glass sheet 22. The thickness of the first glass sheet is preferably 0.7 mm to 3 mm. The first glass sheet is preferably thicker than the second glass sheet by 0.2 mm or more, more preferably by 0.5 mm or more. When the first glass sheet 21 has a thickness of less than 0.7 mm, the rigidity is low so that it is difficult to maintain a predetermined curved shape of the first glass sheet 21. In contrast, when the first glass sheet 21 has a thickness of more than 3 mm, the weight ratio of such a first glass sheet when used as a component of the automotive laminated glass 1 is high, which is not preferred in view of weight reduction of the automotive laminated glass 1. In view of the above, the thickness of the first glass sheet 21 is preferably 1.3 mm to 3 mm, more preferably 1.3 mm to 2.2 mm.

When the second glass sheet 22 is a 0.3- to 1.5-mm thick chemically strengthened glass sheet which is thinner than the first glass sheet 21, breakage of the second glass sheet 22 is prevented even when the shape of the second glass sheet 22 is adjusted to fit the curvature of the first glass sheet 21, and the second glass sheet 22 can conform to the shape of the first glass sheet 21. The second glass sheet 22 having a thickness of less than 0.3 mm tends to have low mechanical strength even when it is laminated because the glass is thin. In contrast, the second glass sheet 22 having a thickness of more than 1.5 mm cannot be easily bent when adjusted to fit the curvature of the first glass sheet. Thus, the second glass sheet 22 tends to break during laminating, or a lamination defect tends to occur due to inevitable gaps. In view of the above, the thickness of the second glass sheet 22 may be preferably 0.3 mm to 1.1 mm, more preferably 0.5 mm to 1.1 mm.

The second glass sheet 22 is preferably one obtained by curving the flat second glass sheet 22. The curved second glass sheet 22 preferably has the same curved shape as the curved first glass sheet 21 before being processed into chemically strengthened glass, i.e., before the convex-side third main surface 223 and the concave-side fourth main surface 224 are subjected to ion exchange treatment.

Examples of usable materials of the second glass sheet 22 include glass compositions such as soda-lime silicate glass as defined in ISO 16293-1 as in the case of the first glass sheet 21. Another example of the material of the second glass sheet 22 may be a coloring component such as iron or cobalt which is suitably adjusted as a component of a glass composition and which takes on gray, green, or blue hues. In addition, any composition that can be subjected to chemical strengthening treatment by ion exchange may be used. For example, alkali aluminosilicate glass, alkali borosilicate glass, or the like may be used. Further, the second glass sheet may be one obtained by the float process.

A chemically strengthened glass sheet can be obtained by the following technique, for example: the second glass sheet 22 before being processed into chemically strengthened glass is subjected to ion exchange by applying a salt for ion exchange which contains alkali ions to the glass sheet by a method such as spraying and then heating the glass sheet; or the second glass sheet 22 before being processed into chemically strengthened glass is immersed in a molten salt heated to a temperature equal to or higher than the melting point.

Table 1 shows examples of a relationship between value of compressive stress, thickness, and warpage of chemically strengthened glass obtained by ion exchange treatment of a 0.55-mm thick flat glass sheet (400 mm×500 mm) of soda-lime silicate glass having a composition defined in ISO 16293-1 obtained by the float process, which includes a bottom surface and a top surface.

To determine the value of warpage, the chemically strengthened glass was placed on a surface plate with the top surface facing down and warpage at the edge of the glass sheet was measured using a feeler gauge. Table 1 shows the amount of warpage (mm) from the measurement as a ratio relative to the long side of the glass sheet (here, 500 mm). The value of compressive stress and the thickness of the compressive stress layer were obtained by using a surface stress meter (FSM-6000LE available from Orihara Industrial Co., Ltd.) based on the optical waveguide effect as the observation principle. The refractive index was 1.52, and the photoelastic constant was 26.0 ((nm/cm)/MPa).

TABLE 1

|   | Value of compressive stress on the top surface (Mpa) | Thickness of compressive stress layer on the top surface (μm) | Value of compressive stress on the bottom surface (Mpa) | Thickness of compressive stress layer on the bottom surface (μm) | Direction and amount of warpage |
|---|---|---|---|---|---|
| 1 | 657 | 9.0 | 711 | 7.7 | Convex on top surface 0.08% |
| 2 | 615 | 8.8 | 638 | 7.6 | Convex on top surface 0.09% |
| 3 | 610 | 14.0 | 616 | 12.3 | Convex on top surface 0.18% |
| 4 | 625 | 11.8 | 640 | 10.0 | Convex on top surface 0.18% |

As shown in Table 1, warpage occurs such that the thicker side of a compressive stress layer becomes a convex side. The present invention applies this phenomenon to automotive glass, and uses the convex-side third main surface 223 as the top surface or the like having a high ion exchange capacity, and the concave-side fourth main surface 224 as a bottom surface or the like having a low ion exchange capacity. After the curved second glass sheet 22 is processed into a chemically strengthened glass sheet, the convex-side third main surface 223 has a thicker compressive stress layer. Consequently, due to the occurrence of warpage, the second glass sheet has a higher curvature after it is processed into chemically strengthened glass sheet.

The curvature of the second glass sheet 22 processed into a chemically strengthened glass sheet is different from the curvature of the first glass sheet 21 that is non-strengthened glass. Thus, when forming a stack 12 to obtain a laminated glass of the first glass sheet 21 and the second glass sheet 22 with the interlayer film 3 therebetween, the second glass sheet 22 needs to be adjusted to have a curvature equal to the curvature of the first glass sheet 21. In the configuration of the present invention, in a stack 12 including the concave-side second main surface 212 and the convex-side third main surface 223 with the thermoplastic interlayer film 3 therebetween before the second glass sheet 22 is adjusted, a gap is generated between the glass sheets at a peripheral region thereof. A jig 4, such as a clip, capable of sandwiching the peripheral region of the stack is used to sandwich the peripheral region, whereby the second glass sheet 22 is pressed to fit the curved shape of the first glass sheet, and the second glass sheet 22 is adjusted to have a curvature equal to the curvature of the first glass sheet 21.

Preferably, the second glass sheet 22 is a glass sheet obtained by the float process, and the fourth main surface is a surface (bottom surface) that was in contact with a tin bath in the float process. A flat glass sheet obtained by the float process, particularly a flat glass sheet obtained by the float process of soda-lime silicate glass as defined in ISO 16293-1, is advantageous in that it can be easily curved. In the float process, a glass ribbon to be processed into a glass sheet is brought into contact with a tin bath during the production, so that one main surface (bottom surface) of the glass sheet has a higher tin content than the other main surface (top surface). Due to the tin content, the top surface has a higher ion exchange capacity for chemical strengthening.

In the automotive laminated glass 1, the compressive stress layer on the third main surface 223 is preferably thicker than the compressive stress layer on the fourth main surface 224 by 3% to 30%. As the difference in thickness between the compressive stress layers is smaller, it is more advantageous in that the glass sheet 22 undergoes less change in the curvature after it is processed into chemically strengthened glass. Yet, as the change is closer to 0%, the cost to process the glass sheet 22 into chemically strengthened glass is higher. Thus, preferably, the compressive stress layer on the third main surface 223 is thicker than the compressive stress layer on the fourth main surface 224 by 3%. When the difference is more than 30%, the glass sheet 22 undergoes a large change in the curvature after it is processed into chemically strengthened glass. Thus, the second glass sheet needs to be greatly adjusted to have a curvature equal to the curvature of the first glass sheet. When the second glass sheet 22 is adjusted, tensile stress is produced on the surface layer of the fourth main surface 224.

The following shows the test results in changes in compressive stress when the chemically strengthened glass is adjusted and tensile stress is produced.

<Chemically Strengthened Glass to be Tested>

A test was performed on a 0.55-mm thick flat glass sheet of soda-lime silicate glass having a composition defined in ISO 16293-1 obtained by the float process, each glass sheet main surface having a compressive stress of 604 MPa and each compressive stress layer having a thickness of 14 μm. The chemically strengthened glass sheet had the same value of compressive stress on both main surfaces.

<Changes in Compressive Stress when Chemically Strengthened Glass is Curved>

A load was applied from one side to the center of the chemically strengthened glass sheet to be tested to deform the glass sheet. The value of compressive stress on the convex side when the glass sheet was deformed was measured. The amount of deformation of the glass sheet and the value of compressive stress are listed below. The value of compressive stress was obtained by using a surface stress meter (FSM-6000LE available from Orihara Industrial Co., Ltd.) based on the optical waveguide effect as the observation principle. The refractive index was 1.52, and the photoelastic constant was 26.0 ((nm/cm)/MPa).

TABLE 2

| Amount of deformation of glass sheet | Value of compressive stress |
| --- | --- |
| 0 mm | 604 MPa |
| 1.7 mm | 559 MPa |
| 2.2 mm | 530 MPa |

A reduction in compressive stress due to tensile stress was observed on the convex side. A large adjustment of the second glass sheet leads to a decrease in the value of compressive stress on the fourth main surface 224 that is an internal surface of the laminated glass 1. Thus, preferably, the compressive stress layer on the third main surface 223 is thicker than the compressive stress layer on the fourth main surface 224 by 30% or less.

In view of the above, the compressive stress layer on the third main surface 223 may be thicker than the compressive stress layer on the fourth main surface 224 preferably by 5% to 25%, more preferably by 5% to 20%.

Specific values with regard to compressive stress are as follows: the compressive stress layer on the third main surface 223 has a value of compressive stress of 400 MPa to 800 MPa and a thickness of 6 μm to 20 μm; (with the proviso that the compressive stress layer on the third main surface 223 is thicker than the compressive stress layer on the fourth main surface 224), and the compressive stress layer on the fourth main surface 224 has a value of compressive stress of 400 MPa to 800 MPa and a thickness of 5 μm to 18 μm.

The first glass sheet 21 and the second glass sheet 22 are laminated together as a result of heating of the thermoplastic interlayer film 3. Examples of the thermoplastic interlayer film 3 include polyvinyl butyral (PVB), ethylene vinyl acetate (EVA), acrylic resin (PMMA), urethane resin, polyethylene terephthalate (PET), and cycloolefin polymer (COP). The interlayer film may be made of multiple resins.

A preferred method of producing the automotive laminated glass 1 includes: a glass sheet curving step of softening and curving a 0.7- to 3-mm thick flat first glass sheet and a second main surface and a 0.3- to 1.5-mm thick flat second glass sheet thinner than the first glass sheet while the first glass sheet and the second glass sheet are overlapped with each other, the first glass sheet including a first main surface and the second glass sheet including a third main surface and a fourth main surface, so as to render the first main surface as a convex-side first main surface, the second main surface as a concave-side second main surface, the third main surface as a convex-side third main surface, and the fourth main surface as a concave-side fourth main surface;

a chemically strengthened glass preparing step of forming a compressive stress layer by ion exchange treatment on each of the convex-side third main surface and the concave-side fourth main surface so as to process the second glass sheet into chemically strengthened glass; and a laminating step of disposing the concave-side second main surface and the convex-side third main surface with a thermoplastic interlayer film therebetween to form a stack 11 of the first glass sheet, the second glass sheet, and the thermoplastic interlayer film and then to form the stack 12, and subsequently thermocompression bonding the thermoplastic interlayer film, the first glass sheet, and the second glass sheet together, wherein the convex-side third main surface has a higher ion exchange capacity than the concave-side forth main surface, the second glass sheet obtained in the chemically strengthened glass preparing step has a curvature higher than the curvature of the first glass sheet, and the second glass sheet is adjusted to fit the curvature of the first glass sheet in the laminating step.

Figure 2:
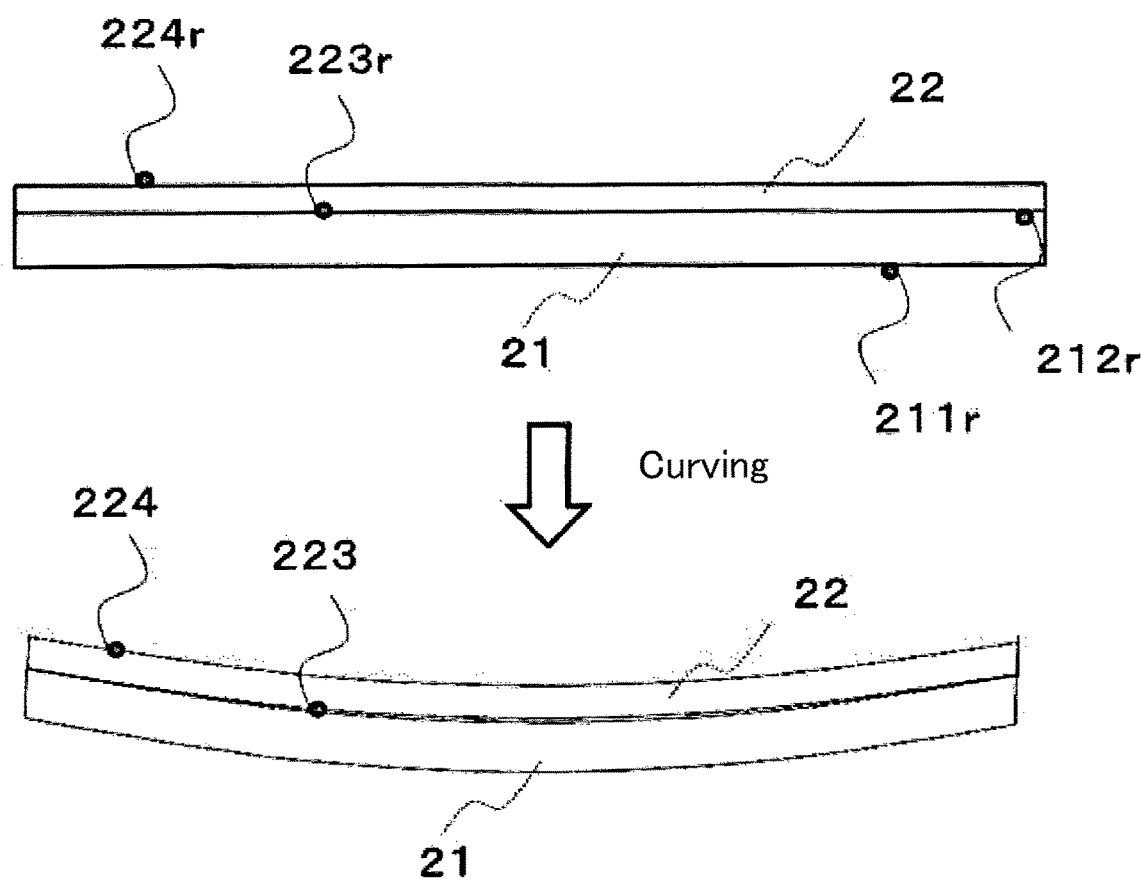
FIG. 2 is a view that schematically describes a step of curving flat first and second glass sheets in a method of producing an automotive laminated glass of the present invention.
Figure 3:
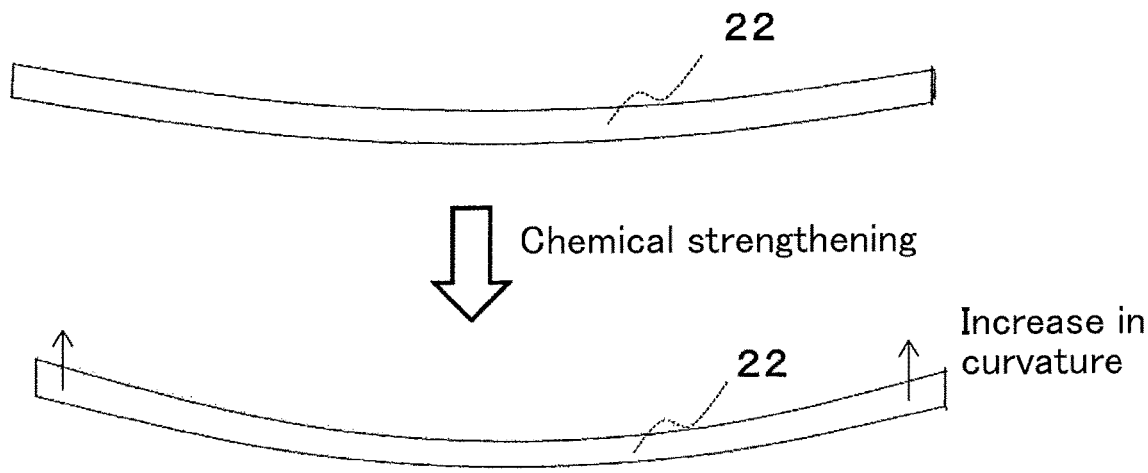
FIG. 3 is a view that schematically describes a step of processing a curved second glass sheet into chemically strengthened glass sheet in the method of producing an automotive laminated glass of the present invention.
Figure 4:
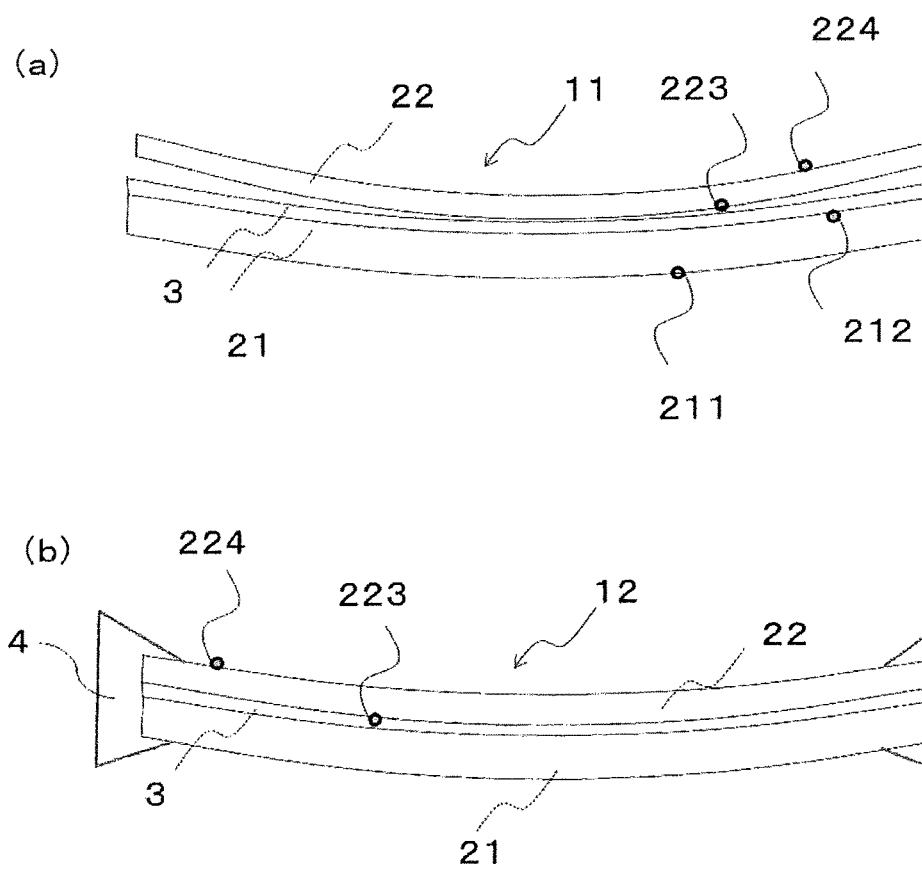
FIG. 4 is a view that schematically describes a laminating step in the method of producing an automotive laminated glass of the present invention.

The steps are described with reference to FIGS. 2, 3, and 4. FIG. 2 is a view that schematically describes the step of curving the flat first and second glass sheets in the method of producing an automotive laminated glass of the present invention. FIG. 3 is a view that schematically describes the step of processing the curved second glass sheet into a chemically strengthened glass sheet. FIG. 4 is a view that schematically describes the laminating step (FIG. 4(a) is a view that shows a stack of the concave-side second main surface 212 and the convex-side third main surface 223 with the thermoplastic interlayer film 3 therebetween, and FIG. 4(b) is a view that describes sandwiching of the peripheral region of the stack by jigs capable of sandwiching such a region so as to adjust the curved shape of the curved glass sheet 22 that has been processed into chemically strengthened glass).

In the glass sheet curving step, as shown in FIG. 2, the flat first glass sheet 21 including a first main surface 211r and a second main surface 212r, and the second glass sheet 22 including a third main surface 223r and a fourth main surface 224r are heated to a temperature close to the softening point to curve these glass sheets to a specific shape while these glass sheets are overlapped with each other such that the main surface 212r and the main surface 223r face each other. The main surface 223r and the main surface 224r are disposed such that the main surface 223r is a surface having a higher ion exchange capacity than the main surface 224r. For example, the main surface 223r is disposed to be a top surface (the main surface 224r is disposed to be a bottom surface).

In this step, for example, a gravity bending method is used in which the overlapped glass sheets 21 and 22 are placed on a ring mold and passed through a heating furnace, whereby the glass sheets 21 and 22 are heated and softened to be bent to a predetermined shape by the gravity. A press molding method may also be used in which the glass sheets 21 and 22 are preliminarily molded by gravity bending, and then the glass sheets 21 and 22 are sandwiched between a ring mold and a press mold and pressurized for molding. Still another method may be used in which the glass sheets are heated to a predetermined temperature while they are horizontally conveyed on multiple rolls provided in a heating furnace, and the heated glass sheets are lifted with a ring mold and brought close to a bending mold, whereby the glass sheets are molded into a shape corresponding to the bending mold. The first glass sheet 21 and the second glass sheet 22 are preferably overlapped with each other via a release agent. The release agent is preferably a ceramic powder that does not dissolve during heating to a temperature close to the softening point of the glass sheets. After the curving step, the first glass sheet 21 and the second glass sheet 22 that are overlapped with each other are temporarily separated.

In the chemically strengthened glass preparing step, the curved second glass sheet 22 is subjected to the ion exchange treatment as described above to form a compressive stress layer on each of the main surfaces 223 and 224, whereby the second glass sheet is processed into chemically strengthened glass. In this step, the curvature of the curved second glass sheet 22 increases as shown in FIG. 3, due to the reasons described above.

In the laminating step, the concave-side second main surface 212 and the convex-side third main surface 223 are disposed with the thermoplastic interlayer film 3 therebetween to form the stack 11 in which a gap is generated between the glass sheets at the peripheral region. Subsequently, as shown in FIG. 4(b), the peripheral region of the stack is sandwiched by the jigs 4, such as clips, capable of sandwiching the peripheral region of the stack. As the peripheral region of the stack is sandwiched, the second glass sheet 22 is pressed to fit the curved shape of the first glass sheet. As a result, the stack 12 is formed in which the second glass sheet 22 is adjusted to have a curvature equal to the curvature of the first glass sheet 21. For example, the stack 12 is pressurized at 1.0 to 1.5 MPa at 100° C. to 150° C. for 15 to 60 minutes, whereby the automotive laminated glass 1 as shown in FIG. 1 can be obtained. Thermocompression bonding can be performed in an autoclave, for example. It is preferred to degas between the thermoplastic interlayer film 3 and the glass sheets 21 and 22 before thermocompression bonding of the thermoplastic interlayer film 3, the first glass sheet 21, and the second glass sheet 22.

REFERENCE SIGNS LIST 1 automotive laminated glass
21 first glass sheet
22 second glass sheet
3 thermoplastic interlayer film
4 jig capable of sandwiching peripheral region of stack

The invention claimed is:

1. An automotive laminated glass, comprising:
a thermoplastic interlayer film; an external, curved first glass sheet; and an internal, curved second glass sheet, the thermoplastic interlayer film being disposed between the curved first and second glass sheets,
wherein the curved first glass sheet is a 0.7- to 3-mm thick non-chemically strengthened glass sheet including a convex-side first main surface and a concave-side second main surface facing the thermoplastic interlayer film,
the curved second glass sheet is a 0.3- to 1.5-mm thick chemically strengthened glass sheet including a convex-side third main surface facing the thermoplastic interlayer film and a concave-side fourth main surface, the curved second glass sheet being thinner than the curved first glass sheet,
the curved second glass sheet further includes a compressive stress layer formed by ion exchange treatment on each of the third main surface and the fourth main surface,
the compressive stress layer on the third main surface is thicker than the compressive stress layer on the fourth main surface, and
the curved second glass sheet has a curvature equal to a curvature of the curved first glass sheet.

2. The automotive laminated glass according to claim 1, wherein the curved first glass sheet has a thickness of 1.3 mm to 3 mm.

3. The automotive laminated glass according to claim 1, wherein the curved second glass sheet has a thickness of 0.3 mm to 1.1 mm.

4. The automotive laminated glass according to claim 1, wherein the curved second glass sheet is a glass sheet obtained by a float process, wherein in the float process, a glass ribbon to be processed into a glass sheet is brought into contact with a tin bath during production, so that the fourth main surface has a higher tin content than the third main surface.

5. The automotive laminated glass according to claim 1, wherein the compressive stress layer on the third main surface is thicker than the compressive stress layer on the fourth main surface by 3% to 30%.

6. The automotive laminated glass according to claim 1, wherein the second main surface and the third main surface are bonded to the thermoplastic interlayer film.

7. The automotive laminated glass according to claim 2, wherein the curved second glass sheet has a thickness of 0.3 mm to 1.1 mm.

8. The automotive laminated glass according to claim 1, wherein the fourth main surface of the curved second glass sheet has a higher tin content than the third main surface.

9. A method of producing an automotive laminated glass, the method comprising:
- a glass sheet bending step of softening and bending a 0.7- to 3-mm thick flat first glass sheet and a 0.3- to 1.5-mm thick flat second glass sheet thinner than the flat first glass sheet while the flat first glass sheet and the flat second glass sheet are overlapped with each other, the flat first glass sheet including a first main surface and a second main surface and the flat second glass sheet including a third main surface and a fourth main surface, so as to render the first main surface as a convex-side first main surface, the second main surface as a concave-side second main surface, the third main surface as a convex-side third main surface, and the fourth main surface as a concave-side fourth main surface;
- a chemically strengthened glass preparing step of forming a compressive stress layer by ion exchange treatment on each of the convex-side third main surface and the concave-side fourth main surface so as to process the curved second glass sheet into chemically strengthened glass; and
- a laminating step of disposing the concave-side second main surface and the convex-side third main surface with a thermoplastic interlayer film therebetween to form a stack of the curved first glass sheet, the curved second glass sheet, and the thermoplastic interlayer film, and thermocompression bonding the thermoplastic interlayer film, the curved first glass sheet, and the curved second glass sheet together,
wherein the compressive stress layer on the convex-side third main surface is thicker than the compressive stress layer on the concave-side fourth main surface, the curved second glass sheet obtained in the chemically strengthened glass preparing step has a curvature higher than the curvature of the curved first glass sheet, and the curved second glass sheet is adjusted to have a curvature equal to the curvature of the first curved glass sheet in the laminating step.

10. The method of producing an automotive laminated glass according to claim 9, wherein a peripheral region of the stack is sandwiched by a jig in the laminating step.

* * * * *